United States Patent
Weis et al.

(10) Patent No.: US 11,073,410 B2
(45) Date of Patent: Jul. 27, 2021

(54) POSITION MEASURING DEVICE

(71) Applicant: DR. JOHANNES HEIDENHAIN GmbH, Traunreut (DE)

(72) Inventors: Stefan Weis, Traunwalchen (DE); Daniel Frese, Traunstein (DE); Wolfgang Holzapfel, Obing (DE)

(73) Assignee: DR. JOHANNES HEIDENHAIN GmbH, Traunreut (DE)

( * ) Notice: Subject to any disclaimer, the term of this patent is extended or adjusted under 35 U.S.C. 154(b) by 277 days.

(21) Appl. No.: 16/241,473

(22) Filed: Jan. 7, 2019

(65) Prior Publication Data
US 2019/0219422 A1    Jul. 18, 2019

(30) Foreign Application Priority Data

Jan. 12, 2018 (DE) ...................... 10 2018 200 449.8

(51) Int. Cl.
*G01D 5/245* (2006.01)
*G01D 5/347* (2006.01)

(52) U.S. Cl.
CPC ....... *G01D 5/2455* (2013.01); *G01D 5/34792* (2013.01); *G01D 5/34746* (2013.01)

(58) Field of Classification Search
CPC ............ G01D 5/2455; G01D 5/34792; G01D 5/34746
See application file for complete search history.

(56) References Cited

U.S. PATENT DOCUMENTS 6,336,362 B1 * 1/2002 Duenas ................. G01F 15/063
                                                              73/313
6,392,224 B1   5/2002 Holzapfel et al.
(Continued)

FOREIGN PATENT DOCUMENTS

DE    102010045355 A1   3/2012
EP         2182330 A2   5/2010
WO        99/08074 A1   2/1999

*Primary Examiner* — Que Tan Le
*Assistant Examiner* — Don J Williams
(74) *Attorney, Agent, or Firm* — Carter Deluca & Farrell LLP

(57) ABSTRACT

A position-measuring device for determining an absolute position includes a measuring scale and a scanning unit that is movable relative to the measuring scale along at least one measuring direction. To generate a scannable signal pattern, the measuring scale has a measuring graduation which includes a raster of stripe elements arranged along the measuring direction at a measuring-scale longitudinal period. For the encoding of an absolute position, the stripe elements have a periodic structure having a measuring-scale transverse period along a transverse direction that is oriented perpendicular to the measuring direction. For scanning the signal pattern, the scanning unit has a two-dimensional detector system having a plurality of detector elements, which includes multiple detector columns having a plurality of detector elements in each case. The detector columns are periodically arranged along the measuring direction and the detector elements are periodically arranged along the transverse direction, so that by scanning the signal pattern, at least three periodic partial incremental signals are able to be generated with regard to relative movements along the measuring direction, as well as at least one absolute-position signal per detector column.

17 Claims, 13 Drawing Sheets

(56) References Cited

U.S. PATENT DOCUMENTS

| | | | | |
|---|---|---|---|---|
| 6,664,535 B1 * | 12/2003 | Nahum | ............. | G01D 5/34792 |
| | | | | 250/231.14 |
| 7,214,928 B2 * | 5/2007 | Mayer | ................ | G01D 5/34715 |
| | | | | 250/231.13 |
| 8,179,129 B2 | 5/2012 | Burkhardt et al. | | |
| 8,689,892 B2 | 4/2014 | Noui-Mehidi | | |
| 2004/0232320 A1 * | 11/2004 | Holzapfel | ............. | G01D 5/366 |
| | | | | 250/231.13 |
| 2012/0262731 A1 | 10/2012 | Nagura | | |
| 2017/0023383 A1 | 1/2017 | Jordil et al. | | |

\* cited by examiner

POSITION MEASURING DEVICE

CROSS-REFERENCE TO RELATED APPLICATIONS

The present application claims priority to Application No. 10 2018 200 449.8, filed in the Federal Republic of Germany on Jan. 12, 2018, which is expressly incorporated herein in its entirety by reference thereto.

FIELD OF THE INVENTION

The present invention relates to a position-measuring device, which is, for example, suitable for determining an absolute position in a highly precise manner.

BACKGROUND INFORMATION

Certain position-measuring devices for determining an absolute position are conventional. On the one hand, for example, certain conventional systems include a plurality of tracks on the side of the scanned measuring scale, which are disposed in parallel and have different measuring graduations, such as a track having an absolutely encoded measuring graduation and also one or a plurality of further tracks with incremental measuring graduations. By arithmetically processing the low-resolution absolute position information obtained during the scanning as well as the high-resolution incremental information, the absolute position is able to be determined in a precise manner.

European Published Patent Application No. 2 182 330 describes such multi-track systems and describes a position-measuring device whose measuring scale has a first track having a periodic structure for the generation of incremental signals along the measuring direction. A second track featuring an absolute position encoding is shifted perpendicular to the measuring direction. To scan the measuring scale, separate sensor devices or detector systems for the periodic structure and for encoding the absolute position are provided on the side of the scanning unit. A disadvantage of this system, for one, is the low tolerance in response to relative displacements of the measuring scale and scanning unit perpendicular to the measuring direction. For another, there is also only low tolerance with regard to a possible relative rotation between the measuring scale and the scanning unit about an axis perpendicular to the plane of the measuring graduation.

In addition to such multi-track systems, there are also position-measuring devices that have only a single track with a measuring graduation on the measuring scale, from whose scanning both an item of absolute position information and an item of incremental information are able to be obtained. These position-measuring devices, which are also referred to as single-track systems, have advantages over the multi-track systems as far as a more compact configuration as well as greater mounting and operating tolerances are concerned. Such single-track systems are available for linear and also for rotatory measuring tasks. In addition, certain systems utilize a variety of scanning principles, i.e., optical, magnetic, inductive, and capacitive scanning methods.

U.S. Pat. No. 8,698,892 describes such single-track systems. The measuring scale of the exemplary embodiment shown in FIG. 4 of U.S. Pat. No. 8,698,892 has periodically arranged structural elements along the measuring direction, and perpendicular thereto, an item of absolute position is encoded via the shape of the structural elements. A camera is provided for scanning the measuring graduation. Disadvantageous in this system are in particular its low displacement tolerances perpendicular to the measuring direction and also the required complex image processing.

Another single-track system is described in German Published Patent Application No. 10 2010 045 355. On the side of the measuring scale, the system has an optically scannable encoding track having a reflective or transmissive grating system. The grating system includes a plurality of differently configured grating regions, which are arranged next to one another along a scanning line and differ from one another by at least one grating property. A disadvantage of this device is that it allows only for a relatively low-resolution absolute position measurement. Moreover, due to the only very small scanning field, the scanning is very susceptible to contamination.

SUMMARY

Example embodiments of the present invention provide a position-measuring device for a high-resolution determination of an absolute position, which has improved mounting and operating tolerances and which provides for interruption-free signal generation while providing high robustness with respect to contamination.

According to an example embodiment of the present invention, a position-measuring device for determining an absolute position includes a measuring scale as well as a scanning unit, which is disposed so as to allow it to move along at least one measuring direction relative to the measuring scale. To generate a scannable signal pattern, the measuring scale has a measuring graduation, which includes a raster of stripe elements arranged along the measuring direction at a measuring-scale longitudinal period. For the encoding of the absolute position along a transverse direction that is oriented perpendicular to the measuring direction, the stripe elements have a periodic structure having a measuring-scale transverse period. To scan the signal pattern, the scanning unit includes a two-dimensional detector system having a plurality of detector elements, which includes multiple detector columns having multiple detector elements in each case. The detector columns along the measuring direction and the detector elements along the transverse direction have a periodic arrangement in each case. This makes it possible to use the scanning of the signal pattern to generate at least three periodic, phase-shifted partial incremental signals with regard to relative movements along the measuring direction, and also at least one absolute-position signal per detector column.

The periodic structure in the stripe elements may include structural elements that are periodically arranged using the measuring-scale transverse period, the extension of the structural elements varying along the measuring direction in the transverse direction.

In this context, the phase relation of the structural elements may be used for encoding the absolute position of the stripe elements.

It is also possible that the measuring-scale transverse period is used for encoding the absolute position of the stripe elements.

In this context it may be provided that at least two different code values are able to be generated via the absolute-position encoding in the stripe elements in each case, and that a code sequence is provided via a plurality of code values, which encodes a position within the measuring range in absolute terms.

The structural elements may have a rhombic arrangement or have at least approximately cosine-like boundary contours.

In addition, it is possible that the measuring scale has at least one additional measuring-graduation track adjacent to the stripe elements in the transverse direction, the additional measuring-graduation track having a high-resolution incremental graduation that extends in the measuring direction.

Scanning of each stripe element along the measuring direction across at least N detector columns may be performed, with the selection of N≥3, in order to generate N periodic, phase-shifted partial incremental signals.

In this context, it is possible that the respective periodic, phase-shifted partial incremental signals result from the summation of detector-element individual signals of each detector column.

It may also be provided that the periodic, phase-shifted partial incremental signals result from the determination of the position-dependent variance of the detector-element individual signals.

Each structural element may be scanned in the transverse direction across at least M lines of detector elements of the detector system in order to generate the at least one absolute-position signal, M≥2 being selected.

In this context, it may be provided that the at least one absolute-position signal per detector column results from the arithmetic processing of detector-element summing signals, which are generated from the connection of each $M^{th}$ detector element of a detector column in each case.

A signal-processing unit may be configured to: determine an incremental position from the periodic, phase-shifted partial incremental signals; select a respective detector column for a group of scanned stripe elements; determine a low-resolution absolute position from the absolute-position signals of the selected detector columns and a stored decoding table; and arithmetically process the incremental position and the low-resolution absolute position in order to arrive at a high-resolution absolute position.

The signal-processing device may furthermore be configured to obtain from the absolute-position signal an item of information regarding a displacement in the transverse direction of the scanning unit and the measuring scale and/or an item of information with regard to a rotation of the scanning unit and the measuring scale about an axis of rotation that extends perpendicular to the measuring-graduation plane.

The scanning unit may include a light source, the detector elements may be arranged as optoelectronic detector elements, and the measuring graduation on the measuring scale may be arranged as an optical amplitude grating or as an optical phase grating.

The position-measuring device may be used in conjunction with different scanning principles. In addition to optical scanning, it is also possible to provide magnetic, inductive, and/or capacitive scanning. In a similar manner, the position-measuring device may be used both for detecting linear and for detecting rotatory relative movements.

Particularly advantageous in the position-measuring device according are the improved mounting and operating tolerances that are achievable through its use. For example, it is possible in this manner to compensate for interfering influences on the position measurement, such as changes in temperature, eccentricity errors in the case of rotatory systems, or else for less than optimally positioned scanning components. In addition, it is possible to obtain not only position information that is of primary interest but also supplementary information with regard to the relative position of the scanning unit and the measuring scale, such as with regard to a possibly existing eccentricity of the graduated disk, which functions as the measuring scale in the rotatory case.

Furthermore, the absolute-position encoding provides for only slight interference in the periodic incremental signals. The incremental signals are therefore able to be extrapolated, thereby allowing for high resolution in the position measurement.

Furthermore, the provided single-field scanning both of the periodic raster in the measuring direction and the absolute-position encoding in a direction transverse thereto that is provided for this purpose provides for high insensitivity or robustness with respect to contamination of the measuring scale.

Further features and aspects of example embodiment of the present invention are described in more detail below with reference to the appended Figures.

BRIEF DESCRIPTION OF THE DRAWINGS

FIG. 3b schematically illustrates the signal processing with the aid of the detector system illustrated in FIG. 3a.

DETAILED DESCRIPTION

Figure 1:
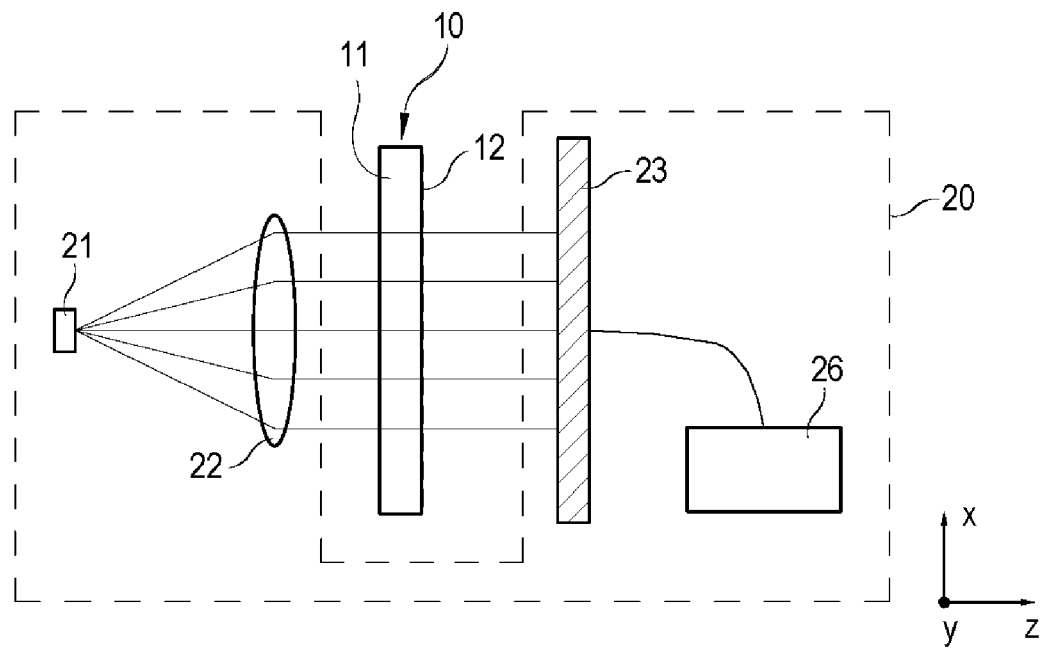
FIG. 1 schematically illustrates the scanning-beam path of a position-measuring device according to an example embodiment of the present invention.
Figure 2:
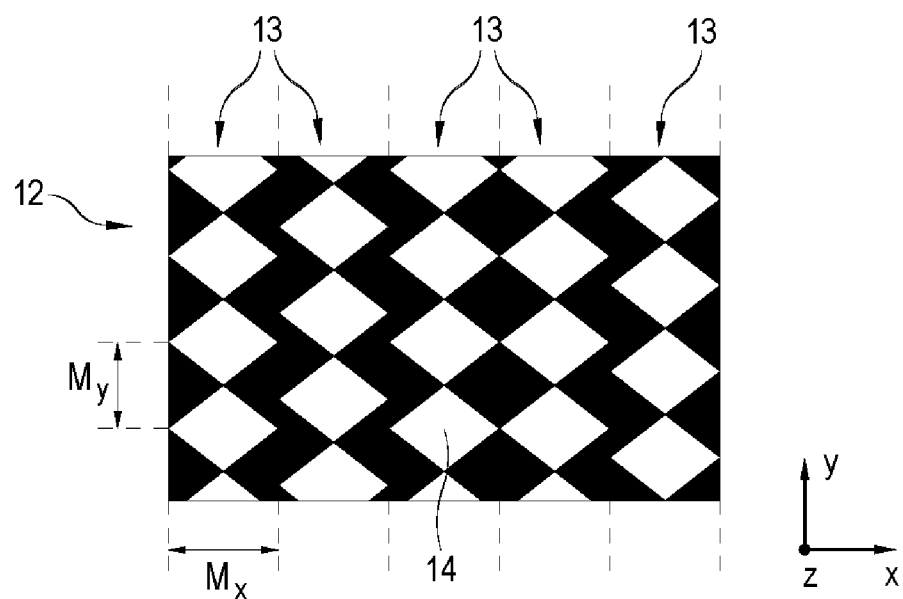
FIG. 2 is a plan view of a part of the measuring scale of the device illustrated in FIG. 1.
Figure 3A:
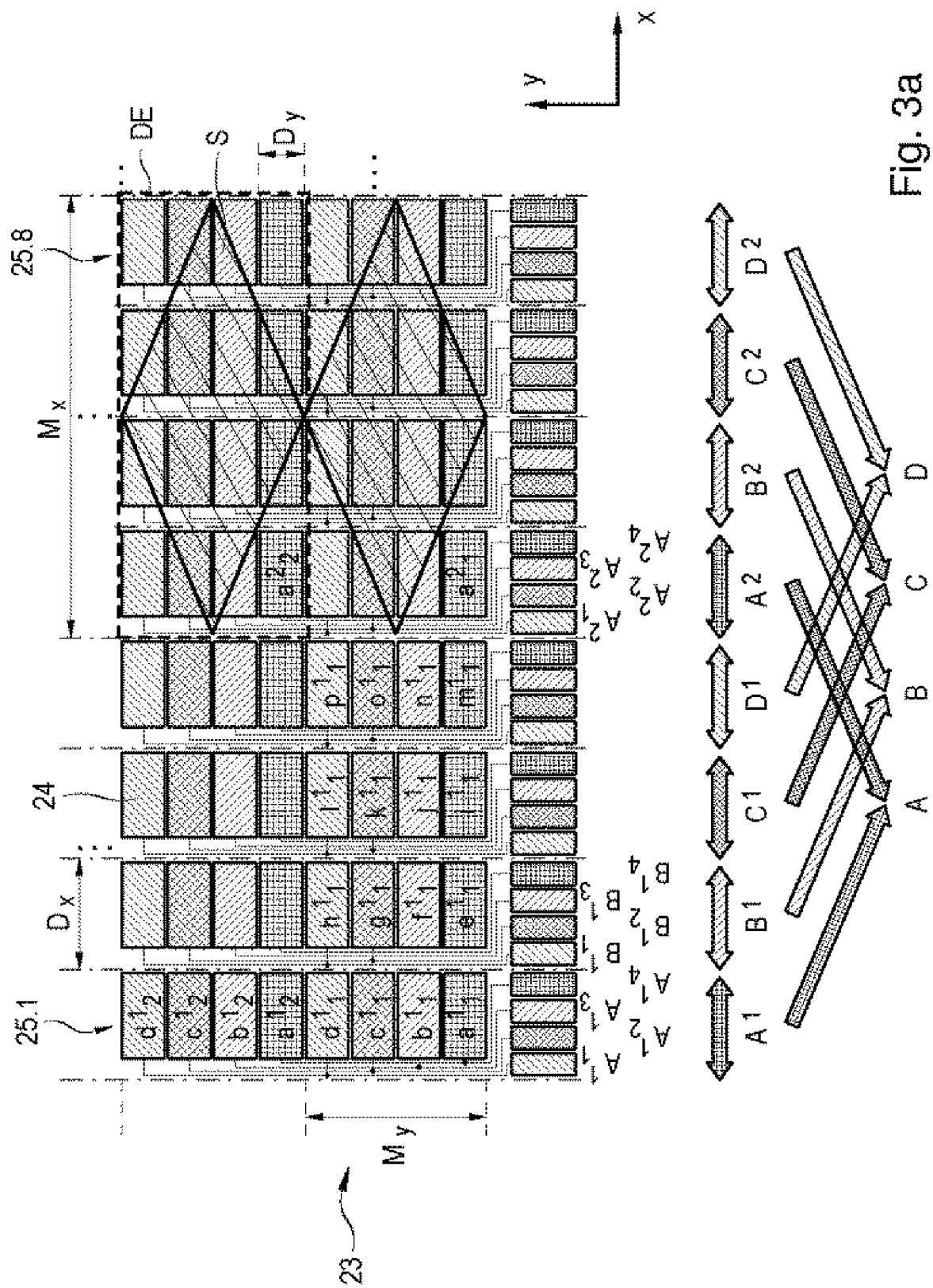
FIG. 3a is a plan view of a part of the detector system of the device illustrated in FIG. 1.
Figure 3B:
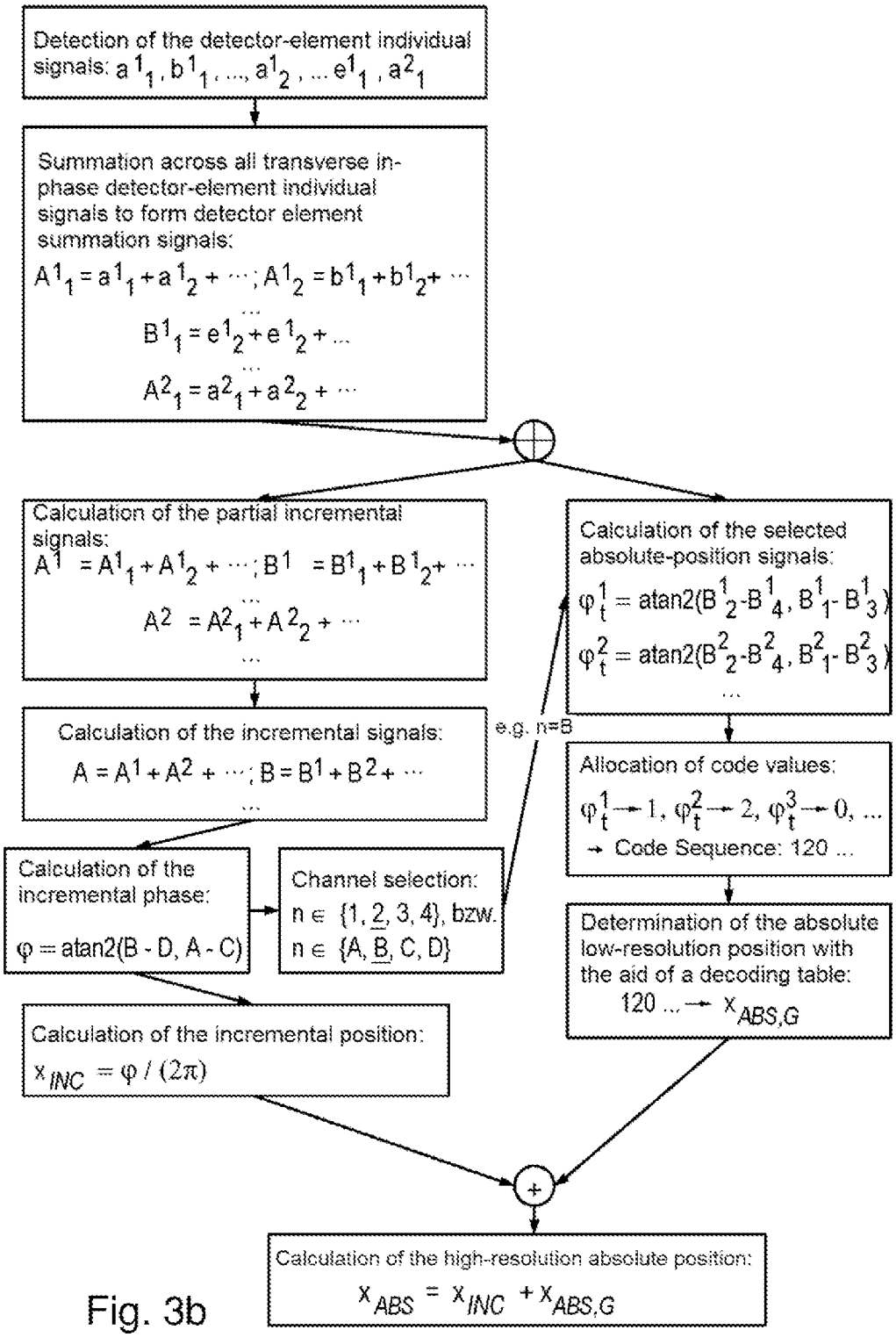

A position-measuring device determining an absolute position according to an example embodiment of the present invention, which is configured as an optical position-measuring device, is described with reference to FIGS. 1, 2, 3a, 3b, and 4a to 4f. FIG. 1 schematically illustrates the scanning-beam path, FIG. 2 is a plan view of a part of the measuring graduation on the measuring scale, and FIG. 3a is a plan view of a part of the detector system. Possible signal processing is described with reference to FIGS. 3b and 4a to 4f.

The position-measuring device may be used for an absolute position measurement along a linear measuring direction x. Disposed along measuring direction x are a measuring scale 10 and a scanning unit 20 in a manner that allows for a movement relative to each other within a specific measuring track. For example, measuring scale 10 may be stationary and scanning unit 20 may be movable; a reverse arrangement is possible as well. Measuring scale 10 and scanning unit 20 are connected to objects that are able to carry out movements relative to one another. These objects may be machine components, for example, which are displaceable relative to one another along measuring direction x within a certain measuring range. Using the position-measuring device, a plurality of position-dependent signals is generated in the form of at least three periodic, phase-shifted partial incremental signals $A^1$, $B^1$, $C^1$, ..., with regard to relative movements along measuring direction x, as well as one or more absolute position signal(s) $\varphi_t^{1,i}$, $\varphi_t^{2,i}$, .... The generated signals may be arithmetically processed to form an absolute position $x_{ABS}$, which makes it possible to indicate the instantaneous position of scanning unit 20 along the measuring track in a highly precise manner, for example. The information pertaining to an absolute position produced in this manner may be further processed by subsequent electronics, e.g., by a machine control unit for the positioning of the machine components.

Alternatively to the arithmetic signal processing in the position-measuring device, it is also possible to transmit the generated position-dependent signals to the subsequent electronics and to arithmetically process them there in order to form absolute position $x_{ABS}$.

In the position-measuring device, an optical scanning principle in the form of incident light scanning of measuring scale 10 is provided for the signal generation. Measuring scale 10 includes a transparent carrier element 11 on which a measuring graduation 12 is provided. Measuring graduation 12 is arranged as an optical amplitude grating and has alternatingly arranged transparent and opaque grating regions. Reference is made in particular to the following description of FIG. 2 for a more detailed description of measuring graduation 12. Provided in scanning unit 20 on one side of measuring scale 10 is a light source 21 and collimation optics 22 arranged upstream from light source 21 in the beam propagation direction. A two-dimensional detector system 23, which has a plurality of optoelectronic detector elements arranged in detector columns, is provided on the opposite side of measuring scale 10 in scanning unit 20. Reference is once again made to the following description, in particular to FIG. 3a, for the details of detector system 23. In addition, a signal processing unit 26 is schematically illustrated in FIG. 1, is arranged in scanning unit 20, and assumes the processing or the arithmetic processing of the different position-dependent signals generated by detector system 23, in order to form absolute position $x_{ABS}$. As far as details of the signal processing are concerned, reference is made to the following description.

A partial plan view of measuring graduation 12 of the position-measuring device is shown in FIG. 2. In order to generate a scannable signal pattern in the detection plane of detector system 23, measuring graduation 12 has a periodically arranged raster of stripe elements 13 along measuring direction x, their periodicity being denoted as measuring-scale longitudinal period $M_x$ in the following text.

The longitudinal direction of individual stripe elements 13 in measuring graduation 12 extends along a direction y, which is oriented perpendicular to measuring direction x and is referred to as transverse direction y in the following text. Along transverse direction y, stripe elements 13 have an absolute-position encoding, which is formed by a periodic structure and includes structural elements 14 that are periodically arranged along transverse direction y. Hereinafter, the periodicity of structural elements 14 along transverse direction y is also referred to as measuring-scale transverse period $M_y$. With the aid of the respective absolute-positioning encoding of a stripe element 13, a defined code value such as 0 or 1 is able to be allocated to corresponding stripe element 13. In this manner, a code sequence is arranged across a plurality of sequential code values, which then encodes a position within the measuring range in absolute terms.

Structural elements 14 shown in a light color in FIG. 2 are transparent, and the regions of measuring graduation 12 shown in dark are opaque. The extension of structural elements 14 along measuring direction x varies in transverse direction y. In the exemplary embodiment illustrated, their transverse extension increases starting from the left boundary of respective stripe element 13 toward the center of stripe element 13 and then decreases again up to the right boundary of respective stripe element 13. In the example illustrated in FIG. 2, structural elements 14 have a rhombic configuration, and the corners of the rhombus are oriented in measuring direction x and in transverse direction y in each case. In this example, the extension of rhombic structural elements 14 in transverse direction y thus varies by 100% between 0 and measuring-scale transverse period $M_y$. The same also holds true for the extension of structural elements 14 in measuring direction x, e.g., the extension in measuring direction x varies by 100% between 0 and measuring-scale longitudinal period M. In alternative exemplary embodiments, it is also possible to provide a lower variation of the extension in transverse direction y and/or in measuring direction x, an extension variation of more than 10% in each case being considered advantageous.

Using the scanning of measuring graduation 12 arranged in this manner or the signal pattern that is able to be produced thereby, it is possible to generate at least three periodic partial incremental signals $A^1$, $B^1$, $C^1$, ..., with regard to relative movements of measuring scale 10 and scanning unit 20 along measuring direction x in conjunction with the detector system described below. Furthermore, at least one absolute position signal $\varphi_t^{1,i}$, $\varphi_t^{2,i}$, ..., per detector column is able to be obtained from scanning the signal pattern in transverse direction y. Partial incremental signals A', B', C', ..., and the at least one absolute position signal $\varphi_t^{1,i}$, $\varphi_t^{2,i}$, ..., per detector column are then arithmetically processed in order to produce at a high-resolution absolute position $x_{ABS}$.

In the illustrated exemplary embodiment, the encoding of absolute position $x_{ABS}$ takes place via the transverse displacement of stripe elements 13 along transverse direction y, which corresponds to a phase shift due to the periodic arrangement of stripe elements 13. This means that a defined code value is able to be allocated to a specific relative displacement of stripe elements 13. At least the unambiguous allocation of two code values is provided via the phase relations of stripe elements 13. For example, this may involve code values 0, 1 of a pseudo random code (PRC) extending in measuring direction x. In this case, either a code value 0 or a code value 1 is allocated to each stripe element 13 in measuring graduation 12. A plurality of such code values of consecutive stripe elements 13 in measuring direction x forms the code sequence or the code word that absolutely encodes a position within the measuring range. For the decoding and determination of the absolute position from the code sequence, a decoding table (lookup table) stored in a memory is used, in which a specific absolute position $x_{ABS}$ is unambiguously allocated to each code sequence.

It should be understood that codes having only two code values is merely exemplary and non-limiting. As the case may be, it is also possible to generate more than two such code values via correspondingly selected phase relations of structural elements 14 in stripe elements 13, which results in great flexibility with regard to the selection of a suitable code for determining an absolute position. For example, the generation of three different code values from the correspondingly selected phase relations of structural elements 14 is possible as well, as specifically provided for in the exemplary embodiment illustrated in FIG. 2. The code value 0 may be allocated to the first stripe element 13 from the left, for example, as well as to the third and fourth stripe elements 13 from the left, in which structural elements 14 are disposed along transverse direction y without a relative phase shift with respect to first stripe element 13 in each case. The code value 1 may be allocated to second stripe element 13 from the left, which has structural elements 14 that are shifted in transverse direction y relative thereto, and the code value 2 to fifth stripe element 13 from the left, which has structural elements 14 that are once again shifted by some other amount along the transverse direction.

Measuring graduation 12, arranged as described above, on measuring scale 10 is illuminated by collimated light. This causes the measuring graduation structure to be imaged or transmitted in the form of a cast shadow as a scannable signal pattern S into the detection plane of detector system 23, which is situated in scanning unit 20 on the opposite side of measuring scale 10. A plan view of a portion of the detection plane in detector system 23 is shown in FIG. 3. Also shown in the right half of the Figure is a portion of transmitted signal pattern S including the cast shadow contour of two structural elements of the measuring graduation. In this exemplary embodiment which features a collimated illumination and shadow cast imaging of the measuring graduation structure, signal pattern S has a periodicity $M_x$ in the detection plane along measuring direction x. This periodicity $M_x$ corresponds to measuring-scale longitudinal period $M_x$ or to the width of a stripe element 13 of measuring graduation 12. Similar thereto, a periodicity $M_y$ of signal pattern S results along transverse direction y, which corresponds to measuring-scale transverse period $M_y$ or the transverse extension of structural elements 14 of measuring graduation 12.

As illustrated in FIG. 3a, detector system 23 is arranged as a two-dimensional detector system or detector matrix, which includes a plurality of optoelectronic detector elements 24 in this instance. Photodiodes, for example, function as suitable detector elements in this context. Individual detector elements 24 are identically configured in entire detector system 23 and in this particular exemplary embodiment have a rectangular shape in each case. The longitudinal axis of the rectangle extends parallel to measuring direction x, and the transverse axis of the rectangle extends parallel to transverse direction y. Detector elements 24 provide signals from the scanning of the signal pattern, which are referred to as detector element individual signals $a^1_1$, $b^1_1$, ..., in the Figures and the following description. The particular detector elements 24 that supply in-phase detector element individual signals $a^1_1$, $b^1_1$, ..., from scanning signal pattern S within a column are identically depicted in FIG. 3a in each case. Since each fourth transverse detector element 24 supplies in-phase signals in the illustrated example embodiment, this is also referred to as four-phase scanning in transverse direction y.

Detector system 23 includes a plurality of detector columns 25.1 to 25.8, which are periodically arranged along measuring direction x and accommodate a plurality of detector elements 24 in each case. FIG. 3a illustrates eight detector columns 25.1 to 25.8 having eight detector elements 24 disposed therein. However, it should be understood that a corresponding detector system 23 may have considerably more detector columns 25.1 to 25.8. In a similar manner, it is also possible to provide more than eight detector elements 24 per detector column 25.1 to 25.8.

The periodicity of detector columns 25.1 to 25.8 in detector system 23 along measuring direction x is denoted by $D_x$ in FIG. 3a. Hereinafter, this is also be referred to as detector-longitudinal period D. Within individual detector columns 25.1 to 25.8, individual detector elements 24 are likewise periodically arranged along transverse direction y, e.g., at detector-transverse period $D_y$.

As furthermore illustrated in FIG. 3a, complete detector system 23 results from the adjacent multiple arrangement of a rectangular detector elementary cell DE along measuring direction x and along transverse direction y. As illustrated in FIG. 3a, in the example embodiment including the cast shadow incident-light scanning, a detector elementary cell DE has an extension that is suitable for the complete scanning of the cast shadow contour of a structural element of the measuring graduation in signal pattern S. A detector elementary cell DE thus has a length along measuring direction x that corresponds to measuring-scale longitudinal period $M_x$, and along transverse direction y, detector elementary cell DE has a length that corresponds to measuring-scale transverse period $M_y$. In the partial plan view of detector system 23 according to FIG. 3a, a total of four such detector elementary cells DE is illustrated, which are disposed next to one another along directions x and y in each case. For example, twenty detector elementary cells DE are provided in measuring direction x, and 4 detector elementary cells DE are provided in transverse direction y.

In this case, N=4 detector elements 24 are periodically disposed in a detector elementary cell DE along measuring direction x, and M=4 detector elements 24 are periodically disposed along transverse direction y. The values selected for N, M result from the number of phase-shifted signals to be generated. As a matter of principle, values for N, M greater than 2 in each case or greater than or equal to 2 are to be selected, i.e. N>2 and M≥2. N and M are not necessarily whole-numbered. All detector elementary cells DE having the same position with regard to measuring direction x thus form a detector stripe element.

With the aid of a detector system 23 arranged in this manner, it is possible to generate both at least three phase-shifted partial incremental signals $A^1$, $B^1$, $C^1$, ..., and at least one absolute position signal $\varphi_t^{1,i}$, $\varphi_t^{2,i}$, ..., per detector column 25.1 to 25.8 via the scanning of signal pattern S that results in the detection plane and the subsequent signal processing in signal-processing unit 26, which signals are able to be arithmetically processed in order to form a high-resolution absolute position $x_{ABS}$. In this context, $\varphi_t^{j,i}$ denotes the absolute position signal of the $j^{th}$ detector column within the $i^{th}$ detector stripe element. A suitable method for this purpose is described in the following text with reference to FIGS. 3a, 3b, and 4a to 4f.

As previously mentioned, polyphase detector elements 24 of detector system 23 supply detector-element individual signals $a^1{}_1$, $b^1{}_1$, . . . , in the event of a relative displacement of the measuring scale in measuring direction x. In FIG. 3a, the detector element individual signal $a^1{}_1$, $b^1{}_1$, . . . , generated thereby is allocated to at least a portion of illustrated detector elements 24.

Figure 4A:
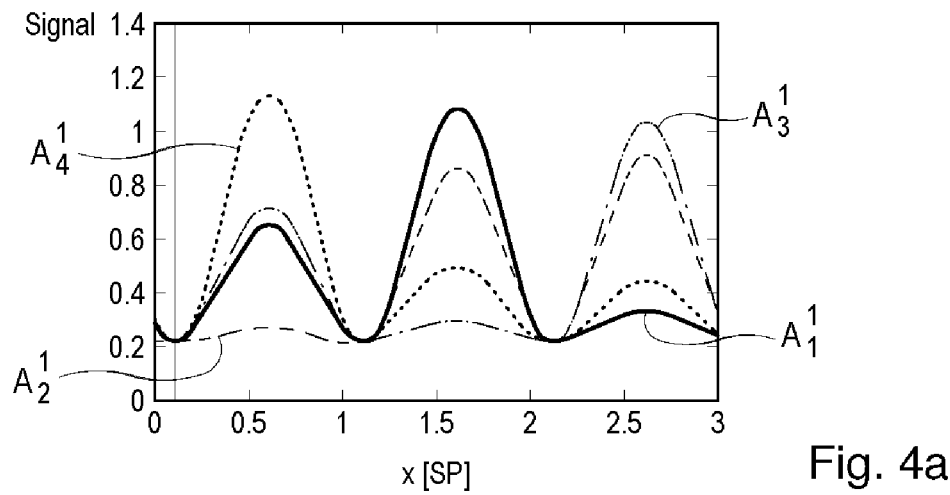
FIGS. 4a to 4f illustrate the signal generation in the device illustrated in FIG. 1.

As further illustrated in FIG. 3a, in each detector column 25.1 to 25.8, the in-phase detector element individual signals $a^1{}_1$, $b^1{}_1$, . . . , are combined to a total of M=4 detector-element summing signals $A^1{}_1$, $A^1{}_2$, $A^1{}_3$, $A^1{}_4$, . . . , e.g., $A^1{}_1 = \Sigma_{i=1}^{M} a^1{}_i$. The characteristic of resulting M=4 detector-element summing signals $A^1{}_1$, $A^1{}_2$, $A^1{}_3$, $A^1{}_4$ from first detector column 25.1 is illustrated in FIG. 4a, for example.

Figure 4B:
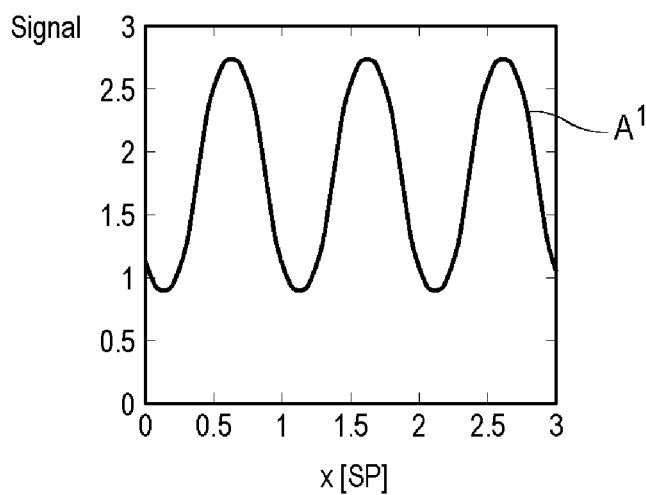

In addition, as illustrated in FIG. 3a, in each detector column 25.1 to 25.8, detector-element summing signals $A^1{}_1$, $A^1{}_2$, $A^1{}_3$, $A^1{}_4$, $B^1{}_1$, $B^1{}_2$, $B^1{}_3$, $B^1{}_4$, . . . , are furthermore summed up to form partial incremental signals $A^1$, $B^1$, $C^1$, $D^1$, $A^2$, $B^2$, $C^2$, $D^2$, . . . , e.g., $A^1 = \Sigma_{i=1}^{4} A^1{}_i$. FIG. 4b illustrates the characteristic of partial incremental signal $A^1$, which results from summing up detector-element summing signals $A^1{}_1$, $A^1{}_2$, $A^1{}_3$, $A^1{}_4$ of first detector column 25.1, and thus from summing up all detector element individual signals $a^1{}_1$, $b^1{}_1$, . . . , of first detector column 25.1. Characteristic of this type of incremental signal generation is that partial incremental signals $A^1$, $B^1$, $C^1$, $D^1$, $A^2$, $B^2$, $C^2$, $D^2$, . . . , are largely independent of the absolute position signals $\varphi_t^{1,i}$, $\varphi_t^{2,i}$, . . . , detected in the detector stripe element.

Figure 4C:
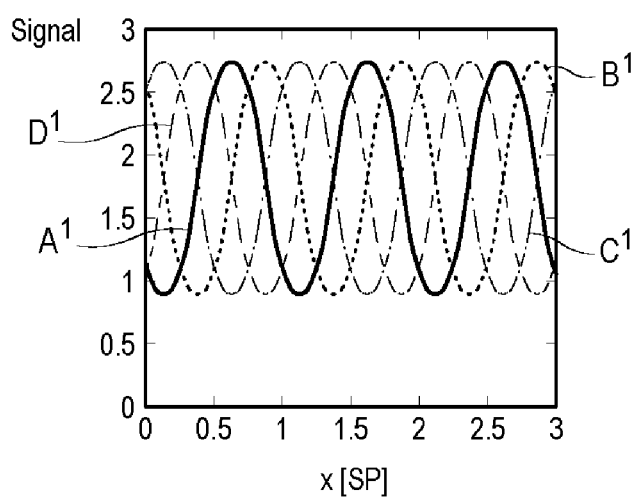

FIG. 4c illustrates the characteristic of all four partial incremental signals $A^1$, $B^1$, $C^1$, $D^1$, phase-shifted by 90° in each case, which are thereby obtained from first four detector columns 25.1 to 25.4.

As illustrated in FIG. 3a, partial incremental signals $A^1$, $B^1$, $C^1$, $D^1$, $A^2$, $B^2$, $C^2$, $D^2$, . . . , generated in this manner are combined to form four phase-shifted incremental signals A, B, C, D, which likewise have a relative phase-offset of 90° with respect to one another. In other words, incremental signal B is phase-shifted by 90° with respect to incremental signal A, incremental signal C is phase-shifted by 180° with respect to incremental signal A, and incremental signal D is phase-shifted by 270° with respect to incremental signal A. For this purpose, all in-phase partial incremental signals $A^1$, $B^1$, $C^1$, $D^1$, $A^2$, $B^2$, $C^2$, $D^2$, . . . , are summed up to form incremental signals A, B, C, D according to $A = A^1 + A^2 + \ldots$, $B = B^1 + B^2 + \ldots$, etc.

Using incremental signals A, B, C, D generated in this manner, a longitudinal phase or a longitudinal incremental phase $\varphi$ is ascertained according to the relationship:

$$\varphi = a\tan 2(B-D, A-C)$$

For the high-resolution incremental position $x_{INC}$ within a signal period, this results in the value:

$$x_{INC} = \frac{\varphi}{2\pi} \text{[signal periods]}.$$

Figure 4D:
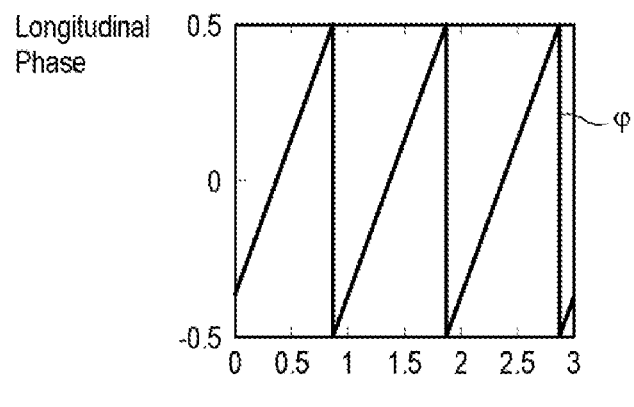

The characteristic of longitudinal incremental phase $\varphi$ in the event of a displacement of measuring scale in measuring direction x is illustrated in FIG. 4d, for example. For better readability, all phase values, longitudinal as well as transverse, are scaled in all Figures (similar to the above computation rule for $x_{INC}$) and indicated in signal periods.

Furthermore, in the position-measuring device, partial incremental signals $A^1$, $B^1$, $C^1$, $D^1$, $A^2$, $B^2$, $C^2$, $D^2$, . . . , are also able to be generated in an alternative manner from the previously described procedure. This method is based on a simple summation across all transverse detector-element summing signals according to:

$$A^1 = A^1{}_1 + A^1{}_2 + A^1{}_3 + A^1{}_4, B^1 = B^1{}_1 + B^1{}_2 + B^1{}_3 + B^1{}_4, \ldots$$

Within the framework of an alternative procedure, use is made of the fact that it is not only the sum per column (or the mean value per column) of the detector-element summing signals that has a periodicity along measuring direction x but also their respective variance. To illustrate this correlation, reference is made to FIG. 4a, where for x=0.625, for example, both the sum of the four signals and their variance assume a maximum. In contrast, at x=1.125, their sum is minimal and the values are substantially identical, e.g., the variance is minimal as well. The empirical standard deviation or the variance, for example, may be used as a measure of this variance.

For example, in the case of four detector-element summing signals $A^1{}_1$, $A^1{}_2$, $A^1{}_3$, $A^1{}_4$, partial incremental signal $A^1$ of the first column (similarly for all further columns) will then be able to be ascertained within the framework of such a procedure in the following manner:

$$\overline{A} = (A^1{}_1 + A^1{}_2 + A^1{}_3 + A^1{}_4)/4$$

$$A^1 = \sqrt{(A^1{}_1 - \overline{A})^2 + (A^1{}_2 - \overline{A})^2 + (A^1{}_3 - \overline{A})^2 + (A^1{}_4 - \overline{A})^2}$$

Here, $\overline{A}$ is the mean value of the detector-element summing signals and, with the exception of a constant factor, partial incremental signal $A^1$ corresponds to the empirical standard deviation.

It is possible to determine partial incremental signal $A^1$ of the first column (similarly for all further columns) in the same or a similar manner also directly from detector-element individual signals $a^1{}_1$, $b^1{}_1$, . . . , or the position-dependent variance of detector-element individual signals $a^1{}_1$, $b^1{}_1$, . . . , of the first column. In the simplest case, it is only necessary to replace detector-element summing signals $A^1{}_1$, $A^1{}_2$, $A^1{}_3$, . . . , as indicated in the last paragraph, with the sums of the detector element individual signals $a^1{}_1$, $b^1{}_1$, . . . , in each case.

As a matter of principle, to generate partial incremental signals $A^1$, $B^1$, $C^1$, $D^1$, $A^2$, $B^2$, $C^2$, $D^2$, . . . , it is additionally also possible to utilize further functional relationships between the detector-element summing signals $A^1{}_1$, $A^1{}_2$, $A^1{}_3$, . . . , or the detector-element individual signals $a^1{}_1$, $b^1{}_1$, . . . and the partial incremental signals $A^1$, $B^1$, $C^1$, $D^1$, $A^2$, $B^2$, $C^2$, $D^2$, . . . .

One advantage of this method is that the values to be computed may possibly already become available as an intermediate result when the transverse phases are determined, as described in the following paragraph, which means that they may already be available for the further processing.

By arithmetically processing longitudinal incremental phase $\varphi$ or incremental position $x_{INC}$ generated in this manner together with an absolute low-resolution position $x_{ABS,G}$, whose generation is described below, the desired high-resolution absolute position $x_{ABS}$ is able to be determined.

For the ascertainment of absolute low-resolution position $x_{ABS,G}$ the—in this instance—four detector-element summing signals $A^1{}_1$, $A^1{}_2$, $A^1{}_3$, $A^1{}_4$ per detector column 25.1 to

25.4 are utilized, which are generated as previously described. From detector-element summing signals $A^1_1$, $A^1_2$, $A^1_3$, $A^1_4$ or $B^1_1$, $B^1_2$, $B^1_3$, ..., an absolute position signal $\varphi_t^{1,i}$, $\varphi_t^{2,i}$, ..., in the form of a transverse phase is ascertained for each column, according to the relationships:

$$\varphi_t^{1,1} = a\tan 2(A^1_2 - A^1_4, A^1_1 - A^1_3), \varphi_t^{2,1} = a\tan 2(B^1_2 - B^1_4, B^1_1 - B^1_3), \ldots$$

Figure 4E:
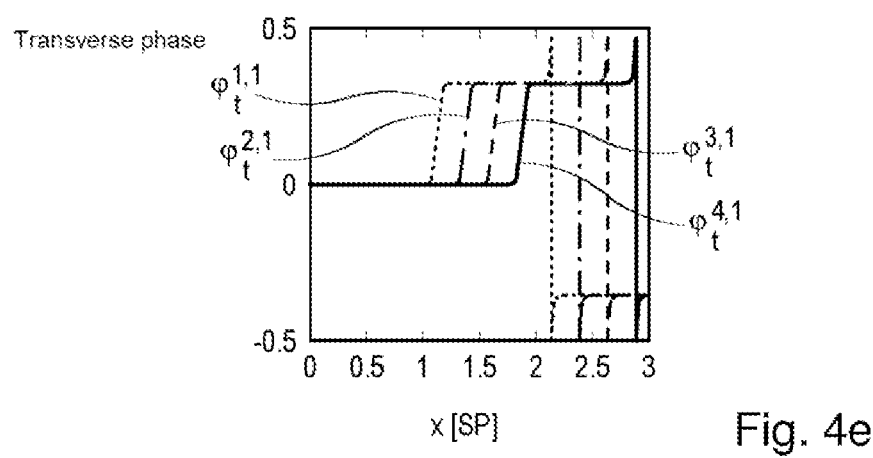
Figure 4F:
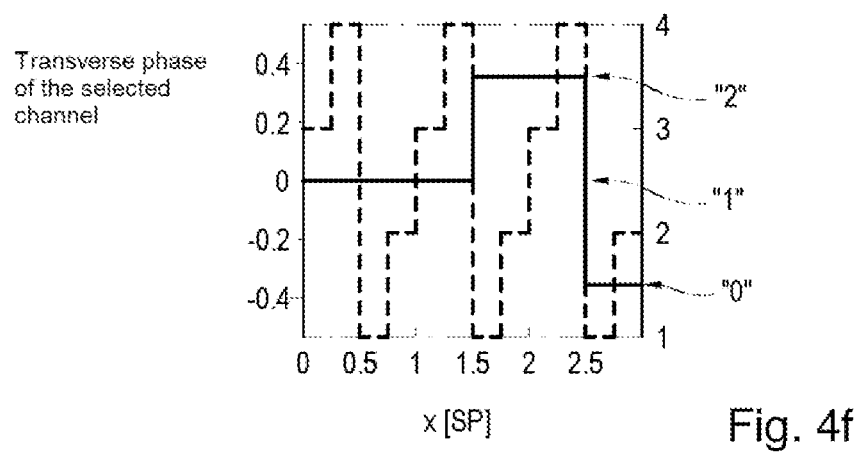

The characteristic of absolute position signals $\varphi_t^{1,1}$, $\varphi_t^{2,1}$, $\varphi_t^{3,1}$, $\varphi_t^{4,1}$ of the first four detector columns 25.1 to 25.4 from the left is exemplarily illustrated in FIG. 4e in the case of a relative movement of the measuring scale.

As illustrated, the absolute position signals $\varphi_t^{1,1}$, $\varphi_t^{2,1}$, $\varphi_t^{3,1}$, $\varphi_t^{4,1}$ generated in this manner in each detector column 25.1 to 25.4 may assume three discrete values in this example, which are able to be utilized as code values of an absolute position encoding in the position-measuring device. Thus, one of three defined code values 0, 1, or 2 may be allocated to each of the stripe elements of the measuring graduation scanned across detector columns 25.1 to 25.8.

In certain example embodiments not all absolute position signals $\varphi_t^{1,i}$, $\varphi_t^{2,i}$, ..., that are generated as described within a detector-element elementary cell DE from the respective detector columns 25.1 to 25.4 are utilized for determining the absolute position. Instead, one detector column is selected for a group of scanned stripe elements, and the absolute position signal $\varphi_t^{1,i}$, $\varphi_t^{2,i}$, ..., resulting from this detector column, or the associated code value, is utilized further. Of the four adjacent detector columns 25.1 to 25.4 that scan a stripe element, for example, the particular detector column 25.1 to 25.4 that is situated at the greatest distance from the transition between adjacent stripes in the signal pattern is selected. There is a static relationship between the ascertained longitudinal incremental phase $\varphi$ (FIG. 4d) and the detector column to be selected, hereinafter also referred to as a channel. Alternatively, it is also possible to use the partial incremental signals of a detector stripe element for selecting the appropriate channel. In the example embodiment illustrated in FIGS. 4a to 4f, for example, the following applies: choose channel 1 if $0.125 \leq \varphi < 0.375$; choose channel 2 if $0.375 \leq \varphi < 0.5$ or $-0.5 \leq \varphi < -0.375$; choose channel 3 if $-0.375 \leq \varphi < -0.125$; choose channel 4 if $-0.125 \leq \varphi < 0.125$. The curve, illustrated by dashed lines, in FIG. 4f (selected channel as a function of the measuring-scale position) thus results directly from the characteristic of longitudinal phase $\varphi$ shown in FIG. 4d. The transverse phase value, shown as a solid line in FIG. 4f, in the selected channel results from the signal representation in FIG. 4e, from which the phase of the respectively selected channel is adopted in a piecewise manner.

For each scanned stripe element of the measuring graduation, an absolute position signal is thereby ascertained from the four detector columns provided for the stripe element scanning in each case, and one of—in this instance—three code values 0, 1, or 2 is allocated to each stripe element via the corresponding detection-channel selection. The result is a code sequence to which an absolute low-resolution position $x_{ABS,G}$ is allocated in a decoding table.

From the arithmetic processing of the incremental position $x_{INC}$ and the absolute low-resolution position $x_{ABS,G}$, it is possible to determine the high-resolution absolute position $X_{ABS}$ that is of interest.

The above-described exemplary embodiment of the position-measuring device featuring optical incident light scanning and collimated illumination is able to be modified on the side of the measuring scale, in particular in order to encode the absolute position in the stripe elements in an alternative manner. A partial plan view of a corresponding alternative measuring scale or an alternative measuring graduation 12' is illustrated in FIG. 5.

Figure 5:
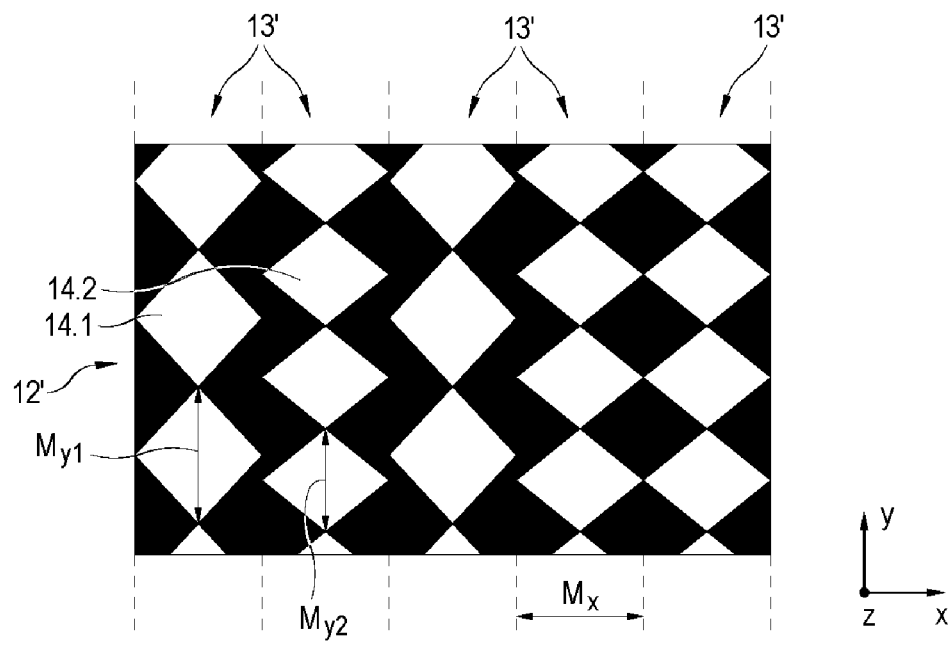
FIG. 5 is a plan view of a part of an alternative measuring-scale variant, which may be used in the device illustrated in FIG. 1.

While in the previous exemplary embodiment, the phase relation of the structural elements in the stripe elements of the measuring graduation are analyzed in transverse direction y for encoding an absolute position, in the arrangement illustrated in FIG. 5, it is provided to utilize measuring-scale transverse period $M_y$ for the absolute position encoding, e.g., the periodicity of structural elements 14' in stripe elements 13' disposed transversely to measuring direction x. Toward this end, differently encoded stripe elements 13' of measuring graduation 12' have at least two different measuring-scale transverse periods $M_{y1}$, $M_{y2}$. In the example illustrated in FIG. 3, for instance, two different measuring-scale transverse periods $M_{y1}$, $M_{y2}$ are provided for structural elements 14.1, 14.2 disposed in these stripe elements 13'. As illustrated in FIG. 3, structural elements 14.1, 14.2, which once again have a rhombic configuration in this instance, then have a correspondingly different size. Accordingly, different code values are allocated to the different measuring-scale transverse periods $M_{y1}$, $M_{y2}$, e.g., the code value 0 to measuring-scale transverse period $M_{y1}$, and the code value 1 to the measuring-scale transverse period $M_{y2}$.

To scan the resulting signal pattern, the detector system illustrated in FIG. 3 must be appropriately adapted with regard to the transverse scanning. For example, the detector elementary cell may have a length in transverse direction y such that a whole-numbered number of different structural elements 14.1, 14.2 from differently encoded stripe elements 13' is able to be accommodated therein.

The generation of the partial incremental signals is performed in a manner that is similar to that of the exemplary embodiment described above.

The arithmetic processing of the signals generated in this manner for generating absolute position information $x_{ABS}$ may be performed as in the first exemplary embodiment.

In connection with this exemplary embodiment, it should also be mentioned as a particular advantage that even algorithmically simpler evaluation methods may be used. In addition, via the detection of the beat frequency of the two frequencies to be detected, a greater displacement of the measuring scale in the transverse direction is able to be detected in absolute terms.

Figure 6:
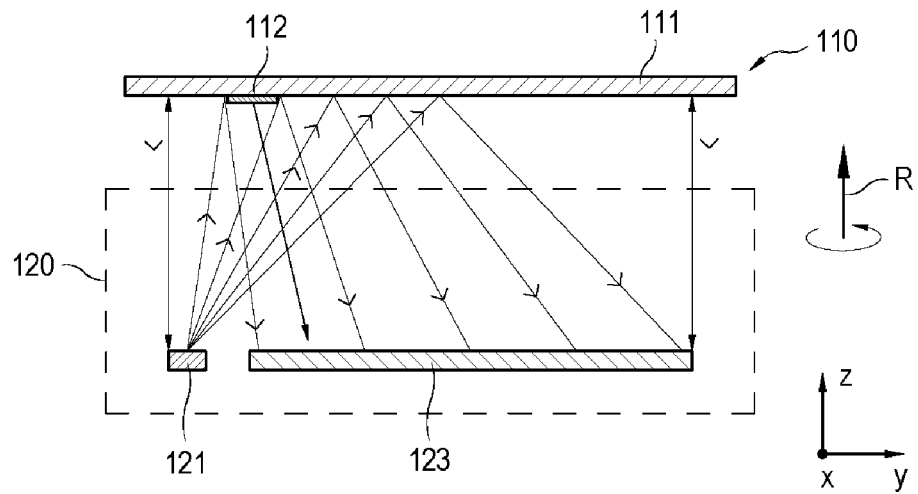
FIG. 6 schematically illustrates the scanning-beam path of a position-measuring device according to an example embodiment of the present invention.
Figure 7:
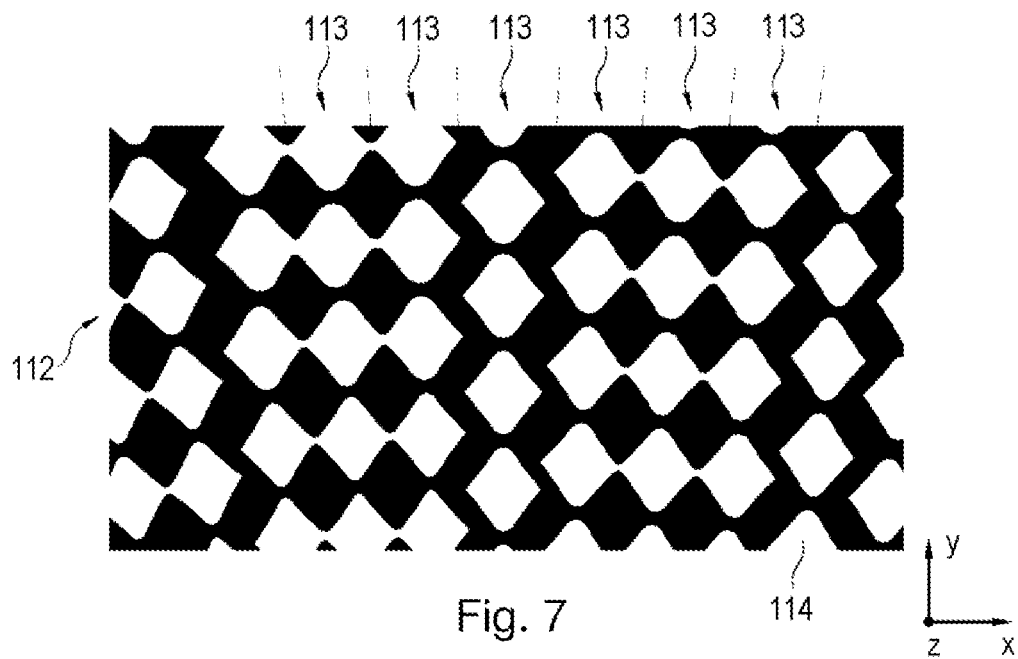
FIG. 7 is a plan view of a part of the measuring scale of the device illustrated in FIG. 6.

A position-measuring device according to another example embodiment of the present invention is described below with reference to FIGS. 6 and 7. FIG. 6 is a schematic cross-sectional view including the scanning-beam path; FIG. 7 is a partial plan view of the measuring scale. In the following text, just as in the subsequent exemplary embodiments, only the most important differences from the first exemplary embodiment are addressed.

The second exemplary embodiment of the position-measuring device is also arranged as an optical position-measuring device. However, divergent incident light scanning is provided. In addition, in contrast to the first example, this position-measuring device is used for detecting relative movements of measuring scale 110 and scanning unit 120 about an axis of rotation R. Measuring direction x thus does not have a linear extension but instead has a circular extension. Measuring scale 110 is arranged as what is referred to as a graduated disk, which includes a circular carrier element 111 in this instance on which a circular measuring graduation 112 having radially oriented grating regions is situated. Once again, measuring graduation 112 is arranged as an optical amplitude grating, but due to the selected scanning principle, it includes grating regions that have different reflectivities, e.g., of reflective and non-reflective grating regions, for instance, which are alternatingly arranged along measuring direction x. The reflective grating regions of measuring graduation 112 are shown in a light color in FIG. 7, and the non-reflective grating regions are shown in a dark color.

Both light source 121 and two-dimensional detector system 123 are situated in a shared plane in scanning unit 120, the latter once again including a plurality of n optoelectronic detector elements disposed in columns. Via light source 121, measuring graduation 112 is divergently illuminated without upstream collimating optics, and a signal pattern is thereby transmitted as a cast shadow into the detection plane of detector system 123. Because of the divergent illumination, this results in an enlargement of the transmitted signal pattern in the detection plane, by an enlargement factor m, which results in the following manner:

$$m=(u+v)/u$$

in which m represents the enlargement factor in the cast-show transmission of the measuring graduation structure into the scannable signal pattern in the detection plane, u represents the distance between the light source and measuring graduation, and v represents the distance between the measuring graduation and the detection plane.

In the case of u=v, an enlargement factor m=2, for example, results using the above equation.

As illustrated in the plan view of a portion of measuring graduation 112 in FIG. 7, stripe elements 113 are once again periodically arranged along measuring direction x. In contrast to the preceding exemplary embodiment, it is furthermore the shape of the reflectively configured structural elements 114 that are periodically arranged along transverse direction y in stripe elements 113 that has been selected. For example, structural elements 114 no longer have a rhombic configuration but feature approximately cosine-like boundary contours. Via boundary contours provided in this manner, undesired harmonic wave components and code-dependent errors in the generated incremental position signals, in particular, are able to be reduced, which would otherwise have a negative effect on the signal generation. To further reduce undesired harmonic waves and code-dependent disturbances in the generated signals, it is also possible to appropriately select the size and form of selected light source 121.

In the following text, using the exemplary embodiment of the rotatory position-measuring device, the manner in which the generated absolute position signals may additionally also be utilized for obtaining information with regard to a displacement of the scanning unit and the measuring scale in the transverse direction (eccentricity error) and/or for obtaining information with regard to a tangential offset of the scanning unit and measuring scale is described.

Figure 8A:
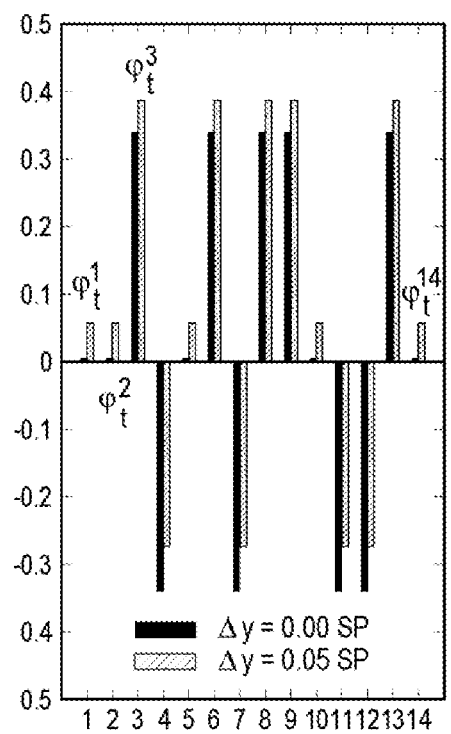
FIGS. 8a and 8b schematically illustrate the possible generation of additional information with regard to the relative position of the measuring scale and scanning unit.

For example, FIG. 8a illustrates the selected absolute position signals $\varphi_t^1, \varphi_t^2, \varphi_t^3, \ldots$, which are obtained with the aid of the detector system from a total of 14 adjacent detector-stripe elements or detector columns, this being illustrated for two different cases. In a first case, a correct mounting situation is present, which involves a graduated disk or measuring standard that is centrically precisely positioned with respect to the scanning unit. In this instance, the selected absolute position signals $\varphi_t^1, \varphi_t^2, \varphi_t^3, \ldots$, shown on the left are generated. In the second case, an eccentricity of the graduated disk or a less than ideal mounting situation is at hand, and the absolute position signals $\varphi_t^1, \varphi_t^2, \varphi_t^3, \ldots$, shown on the right result. Based on the shared phase shift of the absolute position signals $\varphi_t^1$, $\varphi_t^2, \varphi_t^3, \ldots$, it is possible to estimate an existing mounting eccentricity $\Delta y$ and to take it into account in the further signal processing. Alternatively, this information may also be utilized for ensuring the correct mounting.

Figure 8B:
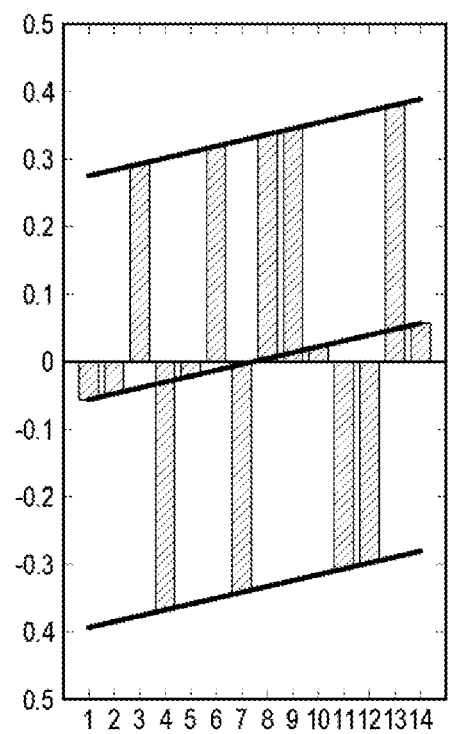

FIG. 8b illustrates the resulting selected absolute position signals $\varphi_t^1, \varphi_t^2, \varphi_t^3, \ldots$, of a rotatory variant of the position-measuring device, which are once again generated with the aid of the detector system from a total of 14 adjacent detector-stripe elements. However, a tangential displacement of the scanning unit relative to the graduated disk is present. As illustrated in FIG. 8b, this causes the values of absolute position signals $\varphi_t^1, \varphi_t^2, \varphi_3, \ldots$, to shift from the ideal mounting position by a value that linearly depends on the position of the detected structural element in the respective detector column. In this manner, it is possible to determine and correct the offset or to take the offset into account during the further measurement.

Via the described acquisition of a possibly existing radial and tangential offset of the scanning unit and the graduated disk, it is not only possible to control the correct mounting but also to detect bearing damage in a timely manner, which usually manifests itself in increasing deviations from the ideal mounting position.

Figure 9:
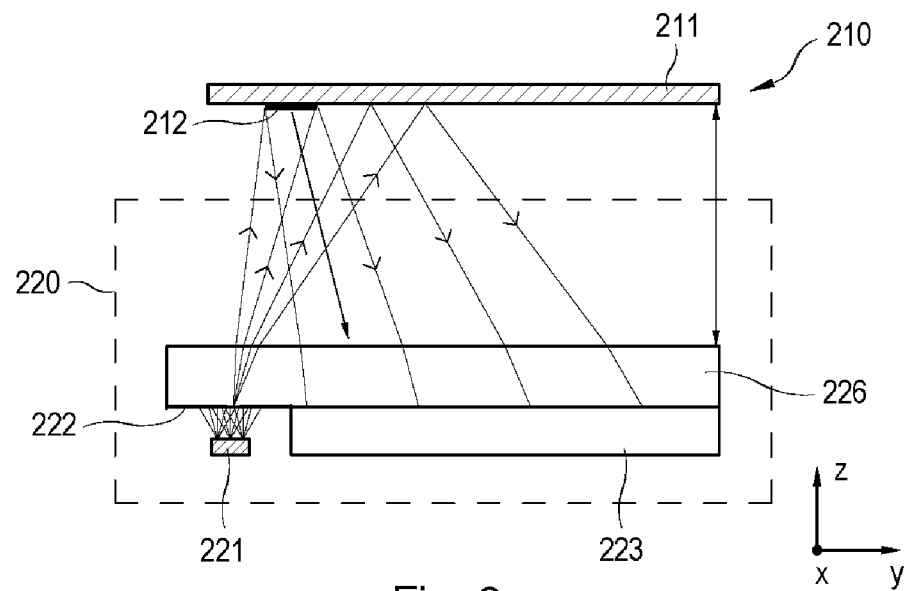
FIG. 9 schematically illustrates the scanning-beam path of a position-measuring device according to an example embodiment of the present invention.

A position-measuring device according to a third example embodiment of the present invention is described below with reference to FIG. 9, which shows a schematic cross-sectional view including the scanning-beam path.

In this instance, optical incident light scanning of measuring graduation 212 is provided once again. Measuring scale 210 and scanning unit 220 are displaceable relative to each other along a linear measuring direction x. In contrast to the previous exemplary embodiment, a transmission grating 222 is disposed upstream from light source 221, which in this case includes a system of transparent and opaque grating regions periodically arranged in the y-direction. Transmission grating 222 is arranged on the particular side of a transparent scanning plate 226 that is allocated to light source 221. Situated immediately adjacent on this side of scanning plate 226 is also detector system 223, which thereby ensure that the transmission grating plane and the detection plane are situated at the same distance from measuring graduation 212 in the scanning-beam path. With the aid of transmission grating 222 provided in the scanning-beam path, even finer structures of measuring graduation 212 than would be possible without transmission grating 222 are able to be transmitted into the detection plane. In this manner, an even higher resolution is able to be achieved when determining a position.

Transmission grating variants that have an alternative configuration may also be used in the position-measuring device. They include opaque elements in each case, which have one or more transparent opening(s), through which the bundles of beams coming from the light source exit in the direction of the downstream elements in the scanning-beam path. The number and the shape of the openings are to be appropriately adapted to the respective scanning method.

Figure 10:
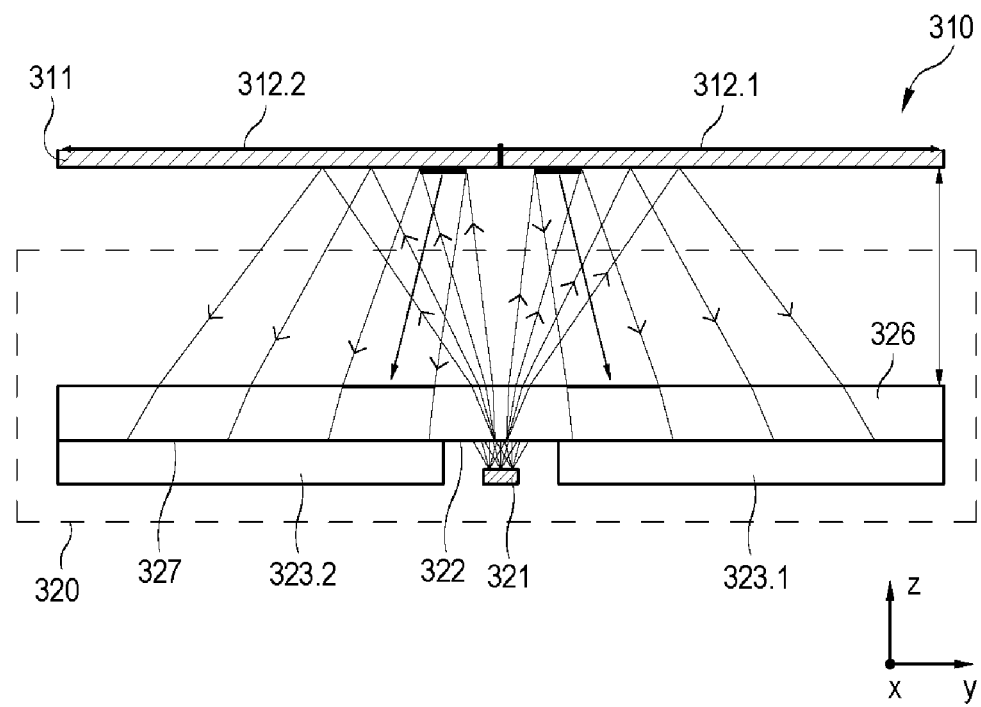
FIG. 10 schematically illustrates the scanning-beam path of a position-measuring device according to an example embodiment of the present invention.
Figure 11:
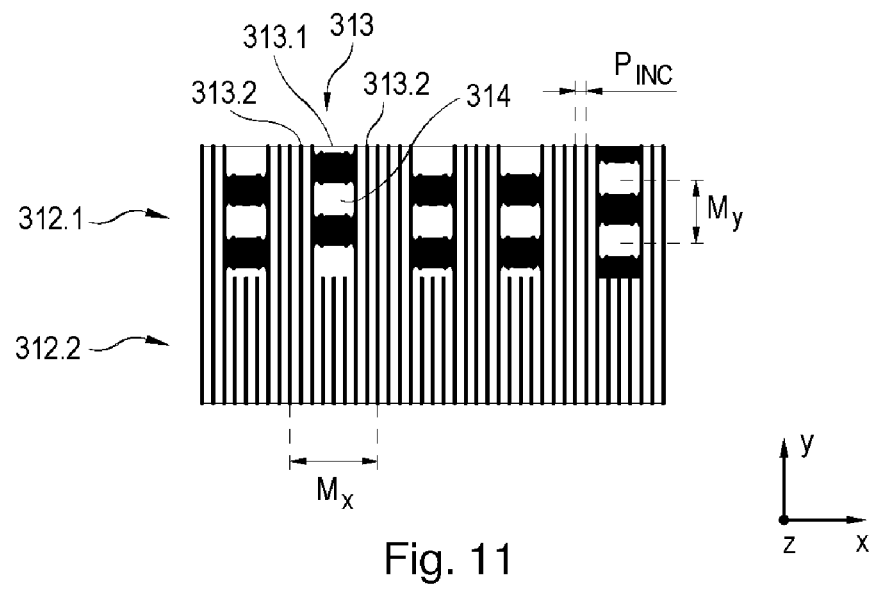
FIG. 11 is a plan view of a part of the measuring scale of the device illustrated in FIG. 10.
Figure 12:
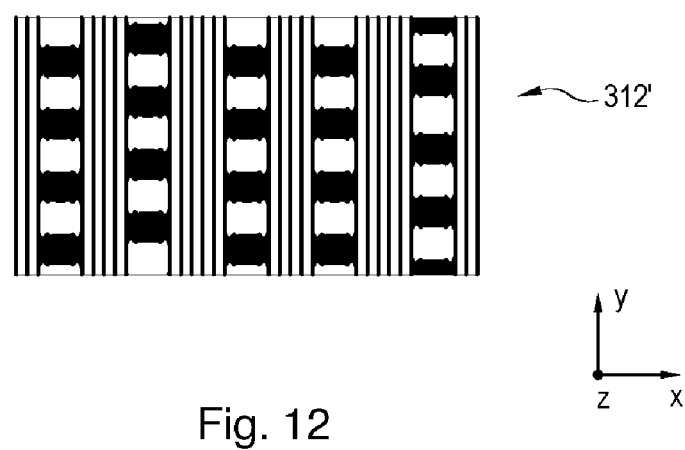
FIG. 12 is a plan view of an alternative variant of a suitable measuring scale for the device illustrated in FIG. 10.

A position-measuring device according to a further example embodiment of the present invention and a variant thereof is described with reference to FIGS. 10, 11, and 12. FIG. 10 is a schematic cross-sectional view including the scanning-beam path, and FIGS. 11 and 12 show partial plan views of different variants of measuring scales or measuring graduations that may be used in this particular exemplary embodiment.

As in the previous examples, optical incident light scanning of measuring scale 310 is provided, measuring scale 310 and scanning unit 320 being displaceable relative to each other along a linear measuring direction x.

In this particular example, the measuring graduation disposed on measuring scale 310 is arranged as a reflective phase grating whose grating regions have different phase-shifting effects on the incident and reflected bundles of beams. The measuring scale is arranged as a multi-track or two-track system and has first and second measuring-graduation tracks 312.1, 312.2 that are disposed adjacently in transverse direction y and extend along measuring direction x. As illustrated in FIG. 11, a periodic system of stripe elements 313 is provided in a first measuring-graduation track 312.1. Stripe elements 313 include a central stripe-element region 313.1 of a width $M_x/2$ with structural elements 314 that are periodically arranged in transverse direction y. In addition, stripe-element regions 313.2 of a width $M_x/4$ with a deflection grating are disposed laterally next to central stripe-element region 313.1 in measuring direction x. The deflection grating includes a transversely unstructured grating having periodicity $P_A$. In this context, it is considered advantageous if the transitions between both regions 313.1, 313.2, as indicated in FIG. 11, are provided as continuously as possible so that no hard separation exists between periodic regions 313.1 in transverse direction y and the deflection gratings in regions 313.2.

In a second measuring-graduation track 312.2, which is located adjacent to first measuring-graduation track 312.1 in transverse direction y, a high-resolution incremental graduation which extends in measuring direction x is provided. It has a similar configuration as the deflection grating in stripe-element regions 313.2 and has a periodicity $P_{INC}$ along measuring direction x. Periodicity $P_{INC}$ of the incremental graduation may be selected to be identical to or also deviating from periodicity $P_A$ of the deflection grating.

On the scanning side, as in the previous exemplary embodiment, a transmission grating 322 is arranged in scanning unit 320 upstream from light source 321, which includes a periodic system of transparent and opaque grating regions in the y-direction. Transmission grating 322 is provided on the underside of a transparent scanning plate 326, which is allocated to light source 321. Placed on the same side of scanning plate 326, directly adjacent, is also the detector system, which includes two separate partial detector systems 323.1, 323.2 in this case. A scanning grating 327 is located upstream from second partial detector system 323.2, which is likewise provided on the underside of scanning plate 326.

The particular bundles of beams that are reflected at the measuring scale by first measuring-graduation track 312.1 reach a first partial detector system 323.1; the particular bundles of beams that are reflected at the measuring scale by second measuring-graduation track 312.2 including the incremental graduation impinge upon second partial detector system 323.2. Second partial detector system 323.2 is therefore used for generating a high-resolution incremental signal, while, similar to the preceding exemplary embodiments, at least one absolute-position signal as well as a plurality of partial incremental signals are able to be generated with the aid of first partial detector system 323.1 and the scanning of first measuring-graduation region 312.1 performed thereby. The partial incremental signals have a lower resolution than the high-resolution incremental signal and are used for generating what is referred to as a subsequent incremental signal, which is considered advantageous for the arithmetic processing of the different signals in order to form a high-resolution absolute position.

From the arithmetic processing of the high-resolution incremental signal with the partial incremental signals having a lower resolution and the absolute low-resolution position obtained from the absolute-position signal, it is possible to determine a high-resolution absolute position in the usual manner.

As an alternative to the measuring graduation having the two differently configured measuring-graduation regions 312.1, 312.2, in this exemplary embodiment of the position-measuring device, it is also possible to use a measuring scale that has a single measuring graduation 312' in the form of a single-track system, of which a partial plan view is illustrated in FIG. 12. The single track of this measuring graduation 312' has the same configuration as first measuring-graduation region 312.1 of the exemplary embodiment illustrated in FIG. 11.

On the detector side, it is possible in the case of such a measuring graduation to use separate detectors for the generation of the high-resolution incremental signals on the one hand, and the lower resolution partial incremental signals as well as the absolute-position signal on the other hand. A particular advantage of this configuration is that the scanning unit may be mounted in any desired manner. In other words, no restricting conditions with regard to the mounting tolerances in the transverse direction have to be taken into account. It is also possible to position the scanning unit at a 180° rotation without any adverse effect on the operativeness of the position-measuring device. Also obtainable in the case of such a measuring graduation is that the scanning of said measuring graduation is performed with the aid of a single detector system. This also requires the placement of a suitably configured transmission grating in the scanning-beam path.

Figure 13:
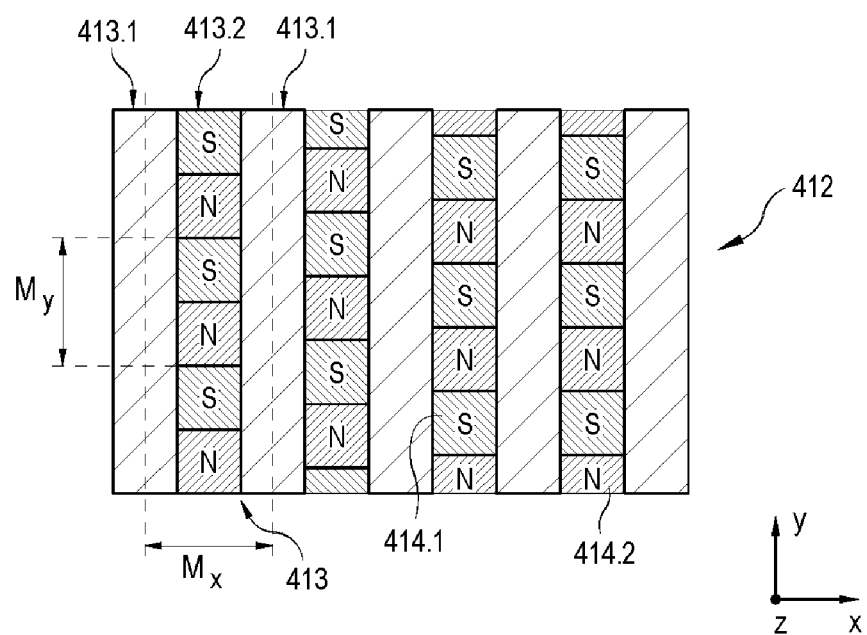
FIG. 13 is a plan view of a part of the measuring scale of a position-measuring device according to an example embodiment of the present invention, which is arranged for magnetic scanning.
Figure 14:
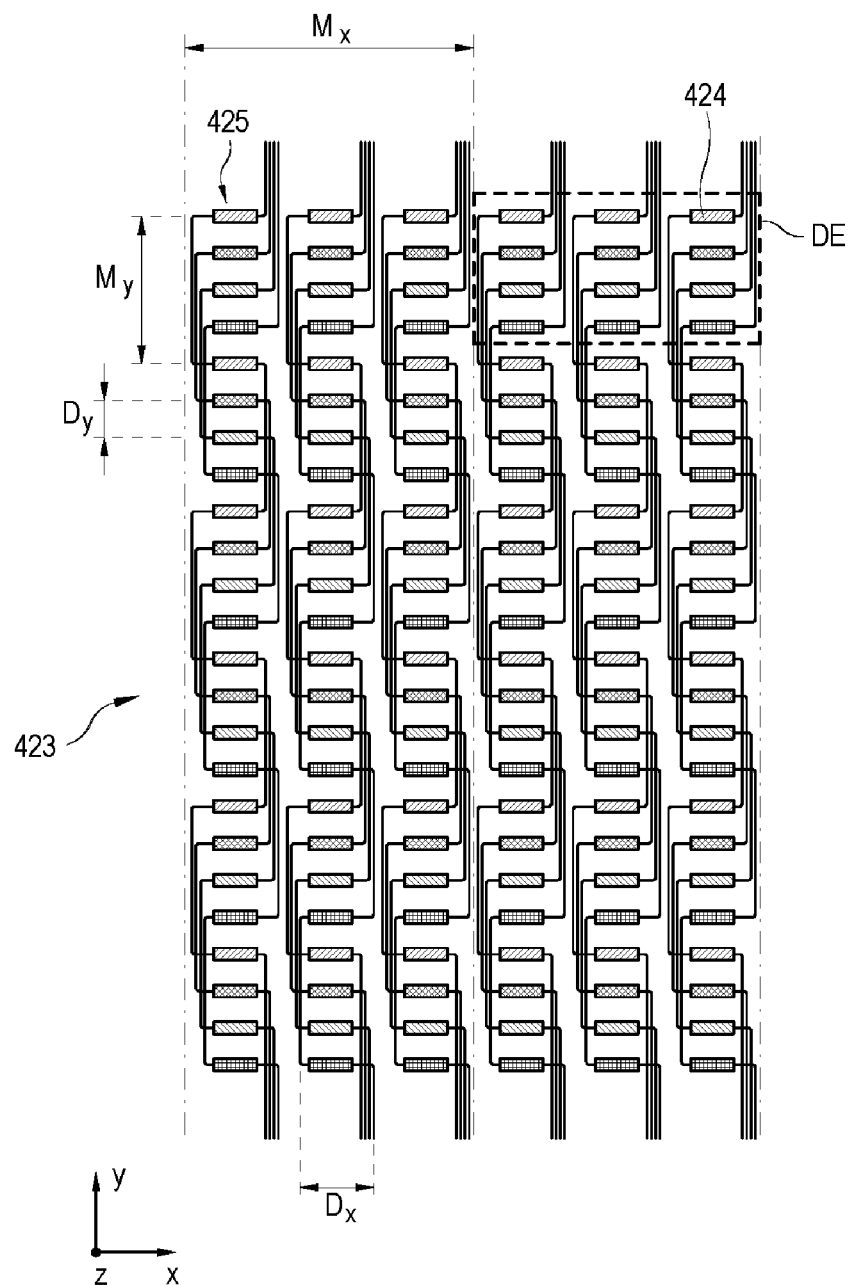
FIG. 14 is a plan view of a part of the detector system for scanning the measuring scale illustrated in FIG. 13.

A fifth exemplary embodiment is described below with reference to FIGS. 13 and 14, FIG. 13 illustrating a partial plan view of the measuring scale, and FIG. 14 illustrating a partial plan view of detector system 423.

While only optical scanning principles have been described in connection with the previously described exemplary embodiments of the position-measuring device, magnetic scanning is provided for scanning the measuring scale. Toward this end, the measuring scale includes a magnetic measuring graduation 412, which has stripe elements 413 that are periodically arranged at measuring-scale longitudinal period $M_x$ in measuring direction x. Per stripe element 413, non-magnetic or constantly magnetized regions 413.1 having width $M_x/4$ as well as a region 413.2, situated in-between having a width $M_x/2$ and a structure that is periodically magnetized in transverse direction y are provided. In this instance, the periodic structure in transverse direction y is formed by magnetic north and south pole regions 414.1, 414.2 alternatingly arranged at measuring-scale transverse period $M_y$.

A two-dimensional detector system 423, whose detector elements 424 are arranged as magnetoresistive detector elements, is used for scanning the resulting signal pattern in the form of a magnetic field distribution predefined by measuring graduation 412. Similar to the optical examples, magnetoresistive detector elements 424 are periodically arranged in the form of columns along measuring direction x. A plurality of periodically arranged detector elements 424 is provided for each detector column 425.

The signal generation and the signal processing are performed in a manner similar to the first described exemplary embodiment.

Figure 15:
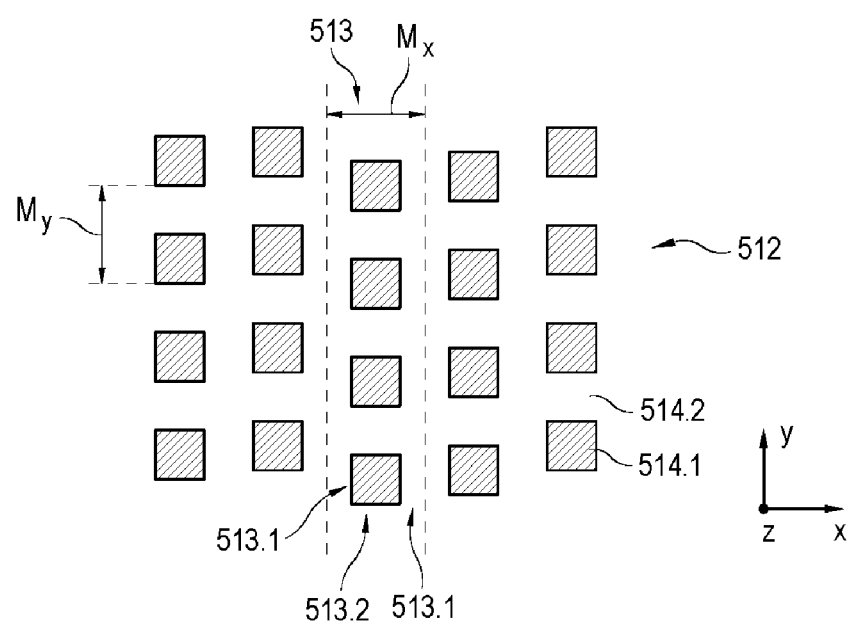
FIG. 15 is a plan view of a part of the measuring scale of a position-measuring device according to an example embodiment of the present invention, which is arranged for inductive scanning.
Figure 16:
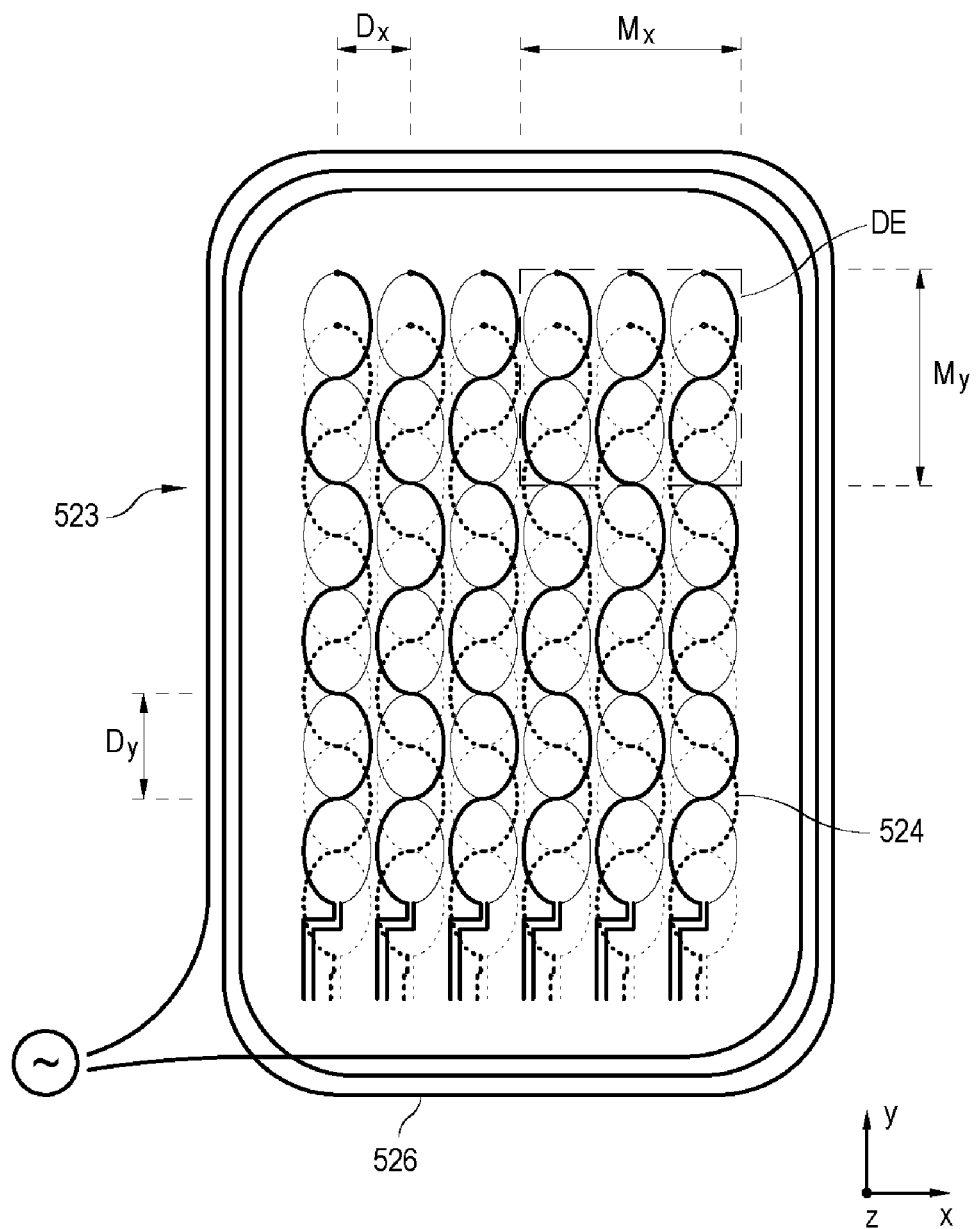
FIG. 16 is a plan view of a part of the detector system for scanning the measuring scale illustrated in FIG. 15.

Finally, a sixth exemplary embodiment will be described with reference to FIGS. 15 and 16. FIG. 15 is a partial plan view of the measuring scale, and FIG. 16 is a partial plan view of detector system 523.

In this example, inductive scanning of the used measuring scale is provided. The measuring scale has an inductive measuring graduation 512, which includes stripe elements 513 periodically arranged in measuring direction x at measuring-scale longitudinal period M. Two non-conductive regions 513.1 having width $M_x/4$ as well as an interposed region 513.2 having width $M_x/2$ and a periodic structure in transverse direction y are provided per stripe element 513. The periodic structure in transverse direction y is formed by electrically conductive regions 514.1 and non-conductive regions 514.2 alternatingly disposed at a measuring-scale transverse period $M_y$.

A two-dimensional detector system 523, whose detector elements 524 are arranged as electrically sensitive conductor loops, is used for scanning the resulting signal pattern in the form of a determined electric field distribution. Similar to the optical examples, the conductor loops or detector elements 524 are periodically arranged in the form of columns along measuring direction x at a measuring-scale longitudinal period M. A plurality of periodically disposed conductor loops or detector elements 524 is provided per column 525. On the scanning side, an excitation coil 526 for generating an oscillating electromagnetic excitation field is additionally provided in this exemplary embodiment.

The signal generation and signal processing are once again performed in the same manner as in the first described exemplary embodiment.

What is claimed is:

1. A position-measuring device for determining an absolute position, comprising:
   a measuring scale; and
   a scanning unit, the measuring scale and the scanning being movable relative to each other along at least one measuring direction;
   wherein, in order to generate a scannable signal pattern, the measuring scale includes a measuring graduation having a raster of stripe elements arranged along the measuring direction at a measuring-scale longitudinal period, and, in order to encode the absolute position, the stripe elements have a periodic structure having a measuring-scale transverse period along a transverse direction that is oriented perpendicular to the measuring direction; and
   wherein, in order to scan the signal pattern, the scanning unit includes a two-dimensional detector system having a plurality of detector elements including a plurality of detector columns each having a plurality of detector elements, the detector columns being periodically arranged along the measuring direction, and the detector elements being periodically arranged along the transverse direction, so that at least three periodic, phase-shifted partial incremental signals are generatable from scanning the signal pattern with regard to relative movements along the measuring direction and at least one absolute position signal per detector column.

2. The position-measuring device according to claim 1, wherein the periodic structure in the stripe elements includes structural elements periodically arranged at the measuring-scale transverse period, and structural elements extend variably in the transverse direction along the measuring direction.

3. The position-measuring device according to claim 2, wherein a phase relation of the structural elements provides absolute position encoding of the stripe elements.

4. The position-measuring device according to claim 3, wherein at least two different code values are generatable via the absolute-position encoding in the stripe elements and a code sequence is generatable across a plurality of code values that encodes a position within the measuring range in absolute terms.

5. The position-measuring device according to claim 2, wherein the measuring-scale transverse period provides absolute position encoding of the stripe elements.

6. The position-measuring device according to claim 5, wherein at least two different code values are generatable via the absolute-position encoding in the stripe elements and a code sequence is generatable across a plurality of code values that encodes a position within the measuring range in absolute terms.

7. The position-measuring device according to claim 2, wherein the structural elements are rhombic or have at least approximately cosine-shaped boundary contours.

8. The position-measuring device according to claim 1, wherein, adjacent to the stripe elements in the transverse direction, the measuring scale includes at least one additional measuring-graduation track having a high-resolution incremental graduation that extends in the measuring direction.

9. The position-measuring device according to claim 1, wherein, in order to generate N periodic, phase-shifted partial incremental signals, scanning of each stripe element along the measuring direction is performed across at least N detector columns, and wherein N 3.

10. The position-measuring device according to claim 9, wherein the periodic, phase-shifted partial incremental signals in each case result from summation of detector-element individual signals of each detector column.

11. The position-measuring device according to claim 9, wherein the periodic, phase-shifted partial incremental signals result from determination of a position-dependent variance of detector-element individual signals.

12. The position-measuring device according to claim 9, wherein, to generate the at least one absolute-position signal, scanning of each structural element in the transverse direction across at least M lines of detector elements of the detector system is performed, and wherein M≥2; and
   wherein the position-measuring device includes a signal-processing unit adapted to: determine an incremental position from the periodic, phase-shifted partial incremental signals; select a detector column for a group of scanned stripe elements and to determine a low-resolution absolute position from the absolute-position signals of the selected detector columns and a stored decoding table; and arithmetically process the incremental position and the low-resolution absolute position in order to form a high-resolution absolute position.

13. The position-measuring device according to claim 12, wherein the signal-processing unit is further adapted to generate from the absolute-position signal an item of information with regard to a displacement of the scanning unit and the measuring scale in the transverse direction, and/or an item of information with regard to a rotation of the scanning unit and the measuring scale about an axis of rotation that is arranged perpendicular to a measuring-graduation plane.

14. The position-measuring device according to claim 1, wherein, to generate the at least one absolute-position signal, scanning of each structural element in the transverse direction across at least M lines of detector elements of the detector system is performed, and wherein M≥2.

15. The position-measuring device according to claim 14, wherein at least one absolute-position signal per detector column results from arithmetic processing of detector-element summing signals formed from an interconnection of each Mth detector element of a detector column.

16. The position-measuring device according to claim 1, wherein the scanning unit includes a light source, the detector elements are arranged as optoelectronic detector elements, and the measuring graduation on the measuring scale is arranged as an optical amplitude grating or as an optical phase grating.

17. A position-measuring device for determining an absolute position, comprising:
- a measuring scale; and
- a scanning unit, the measuring scale and the scanning being movable relative to each other along at least one measuring direction;
- wherein, in order to generate a scannable signal pattern, the measuring scale includes a measuring graduation having a raster of stripe elements arranged along the measuring direction at a measuring-scale longitudinal period, and, in order to encode the absolute position, the stripe elements have a periodic structure having a measuring-scale transverse period along a transverse direction that is oriented perpendicular to the measuring direction; and
- wherein the scanning unit includes a two-dimensional detector system having a plurality of detector elements including a plurality of detector columns each having a plurality of detector elements, the detector columns being periodically arranged along the measuring direction, and the detector elements being periodically arranged along the transverse direction, the scanning unit being adapted to scan the signal patter and to generate at least three periodic, phase-shifted partial incremental signals from scanning the signal pattern with regard to relative movements along the measuring direction and at least one absolute position signal per detector column.

* * * * *